Figure 1:
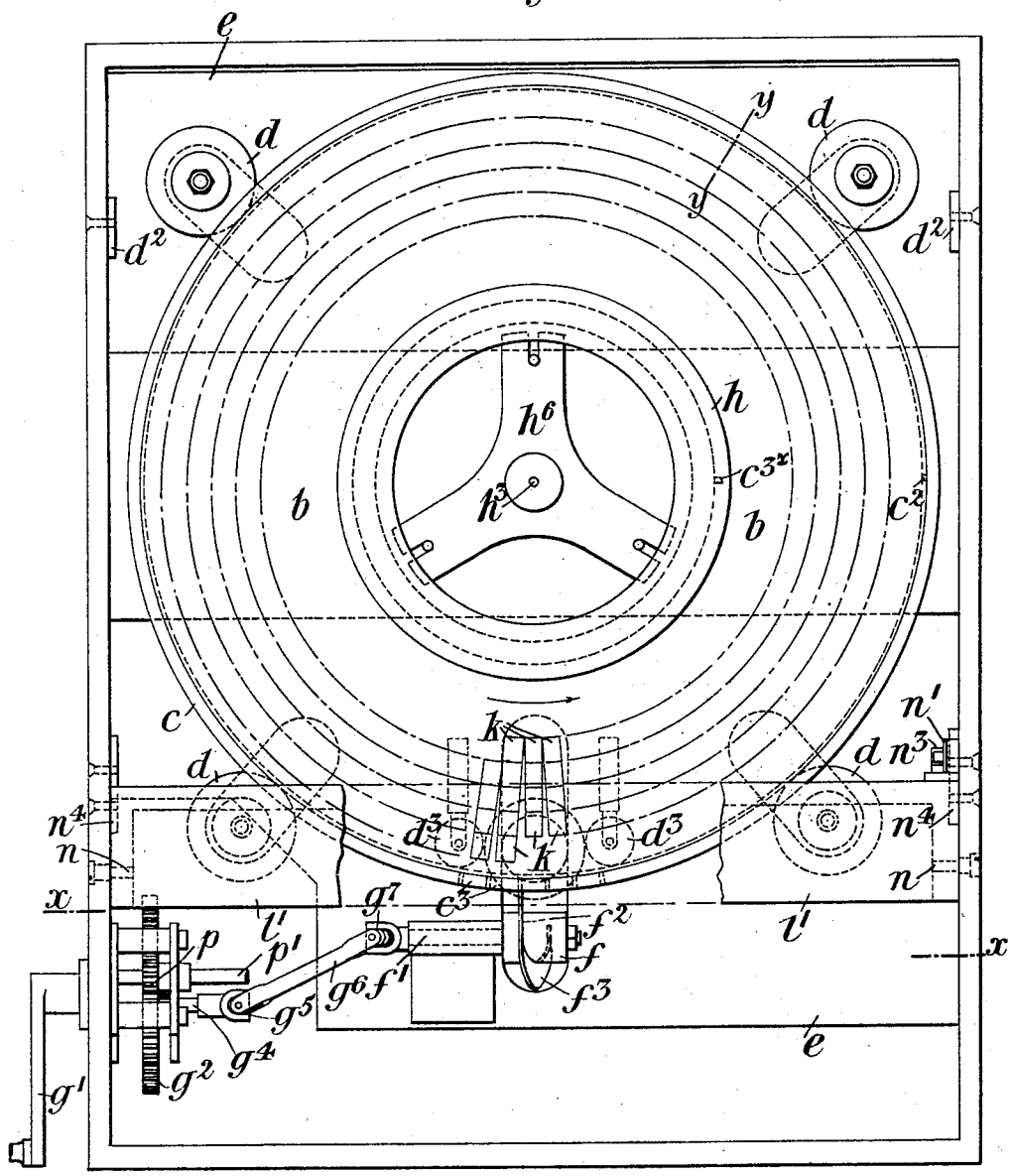

No. 643,718. Patented Feb. 20, 1900.
L. U. KAMM.
KINETOSCOPE.
(Application filed Aug. 22, 1898.)

(No Model.) 3 Sheets—Sheet 1.

Witnesses:
Inventor:

No. 643,718. Patented Feb. 20, 1900.
L. U. KAMM.
KINETOSCOPE.
(Application filed Aug. 22, 1898.)
(No Model.) 3 Sheets—Sheet 2.
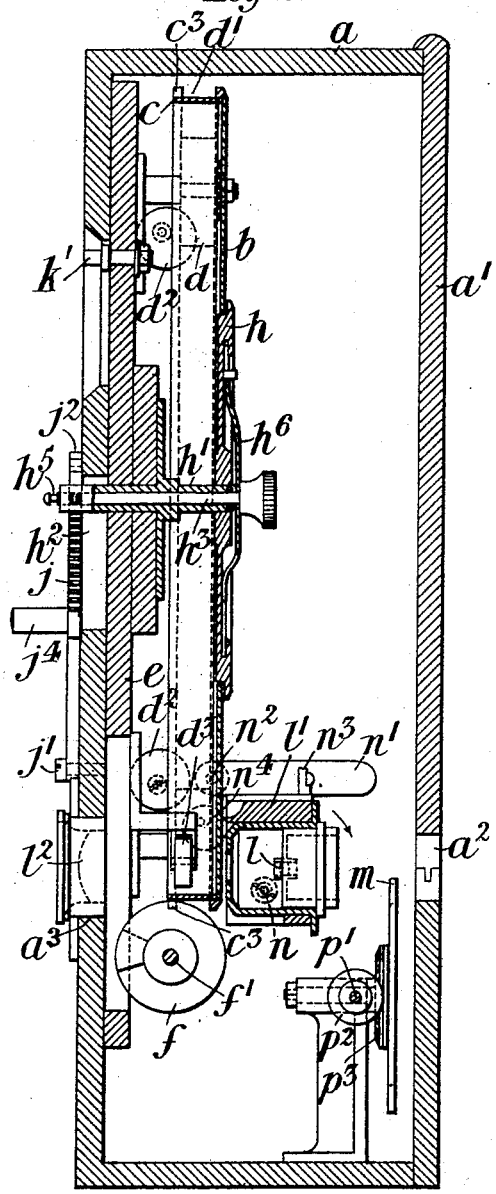
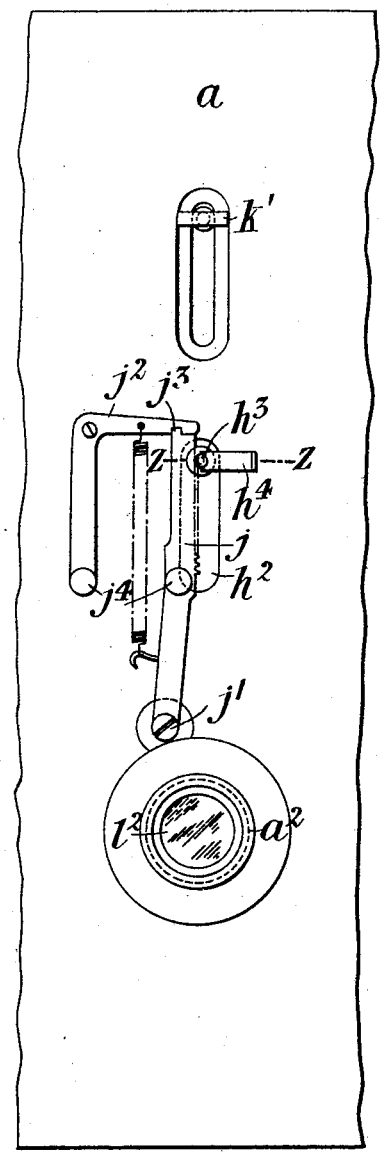
Witnesses: Inventor.

No. 643,718. Patented Feb. 20, 1900.
L. U. KAMM.
KINETOSCOPE.
(Application filed Aug. 22, 1898.)
(No Model.) 3 Sheets—Sheet 3.
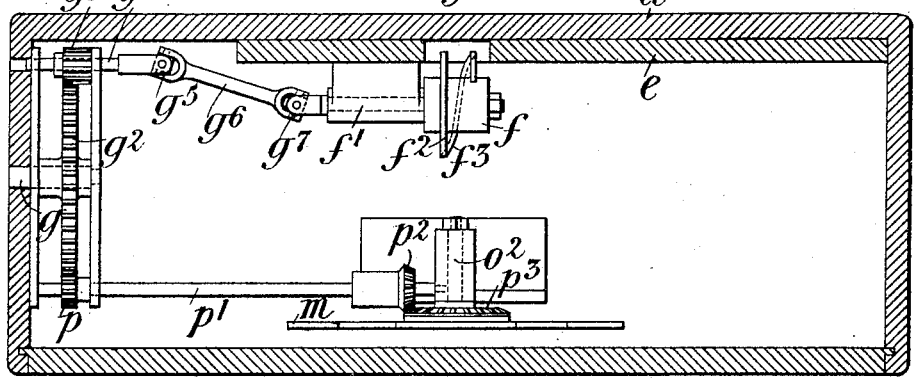
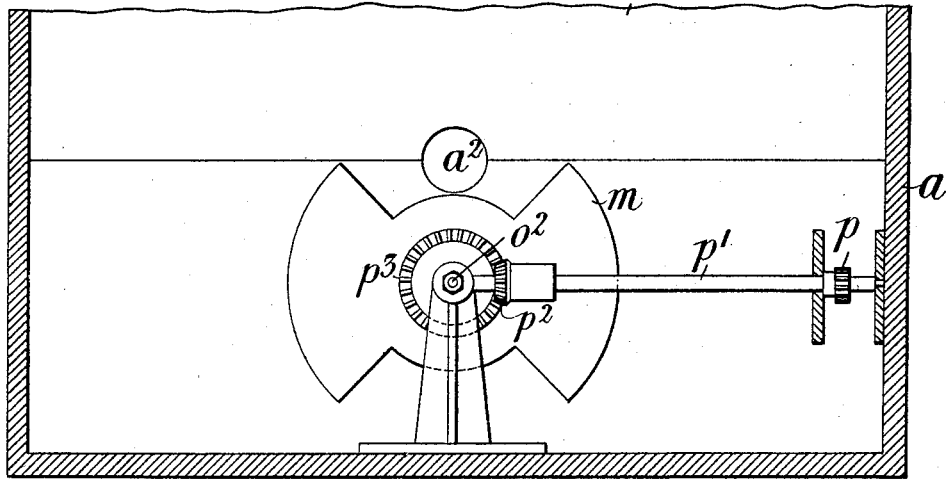
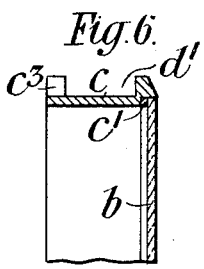
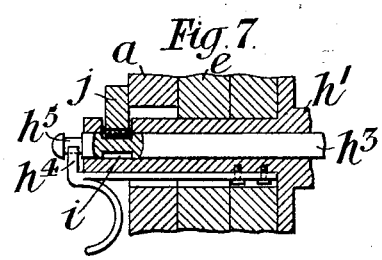
Witnesses: Inventor.

UNITED STATES PATENT OFFICE.

LEONARD ULRICH KAMM, OF LONDON, ENGLAND.

KINETOSCOPE.

SPECIFICATION forming part of Letters Patent No. 643,718, dated February 20, 1900.

Application filed August 22, 1898. Serial No. 689,263. (No model.)

*To all whom it may concern:*

Be it known that I, LEONARD ULRICH KAMM, a subject of the Queen of Great Britain, residing at London, England, have invented new and useful Improvements in Apparatus for Exhibiting Kinematographic Pictures, (for which I have applied for a patent in Great Britain, No. 6,515, dated March 17, 1898,) of which the following is a specification.

This invention relates to apparatus for exhibiting kinematographic pictures of the kind wherein the series of pictures is arranged spirally on a transparent plate or film, the said plate or film having a rectilinear and an intermittent rotary movement and mounted in a toothed ring operated by a spiral cam.

According to my invention I effect the rectilinear movement of the picture-plate by a pinion connected thereto and gearing with a fixed rack capable of being disengaged from the said pinion when required to return the latter to its initial position. The toothed ring carrying the picture-plate is guided by rollers, and the shaft of the spiral cam which operates the toothed ring is provided with universal joints and is operated by a crank-handle. A rotary shutter is provided for shutting off the light when the disk or ring is moving, the said shutter being operated by the crank-handle through suitable gearing.

Referring to the accompanying drawings, Figure 1 is an elevation, with certain parts removed, of my apparatus for exhibiting kinematographic pictures. Fig. 2 is a central vertical section, and Fig. 3 an end elevation, of the same. Fig. 4 is a section on the line $x\,x$, Fig. 1. Fig. 5 is a similar view to Fig. 1 of the lower part of the apparatus, but looking in the opposite direction. Fig. 6 is a section on the line $y\,y$, Fig. 1, to a larger scale. Fig. 7 is a section on the line $z\,z$, Fig. 3, also to a larger scale.

$a$ is the case of the apparatus, provided with the sliding door $a'$, and $b$ is the transparent picture-plate in the form of a disk or ring, the said plate having a spiral series of pictures thereon, as indicated by the dotted lines in Fig. 1.

$c$ is the toothed ring, in a rabbet in which the plate $b$ is mounted, the said rabbet being provided with a soft packing $c'$, Fig. 6, for the plate $b$ to bed against and with a pin $c^2$, engaging a notch in the plate $b$, as shown in Fig. 1.

$d\,d$ are the rollers supporting and guiding the ring $c$, which rollers engage with a groove $d'$ in the outer periphery of the ring and are mounted on a sliding plate $e$, kept in contact with one end of the case $a$ by adjustable eccentric disks $d^2$, which act as guides.

$f$ is the spiral cam engaging with the teeth $c^3$ of the ring $c$, the said cam being mounted on the shaft $f'$ and of the shape shown—that is to say, with a straight portion $f^2$ and an angular portion $f^3$—so that when rotated it will impart an intermittent rotary motion to the plate $b$. The cam is rotated from the shaft $g$, having a crank-handle $g'$, through the medium of the gear-wheels $g^2\,g^3$, shaft $g^4$, sliding longitudinally in its bearings, universal joint $g^5$, shaft $g^6$, and universal joint $g^7$, the said joints being necessary by reason of the sliding movement of the plate $e$.

$d^3\,d^3$ are additional rollers, which bear against the inner periphery of the ring $c$ just above the cam $f$, so as to prevent its becoming disengaged from the cam by wear of the top rollers $d$.

$h$ is a disk for holding the plate $b$ in the ring $c$, the said disk being rabbeted at its periphery to engage the inner edge of the plate $b$ and provided with a pin $c^{3\times}$ to engage a notch in the plate $b$, as shown in Fig. 2, and with a central hole to engage a shaft or support $h'$ on the sliding plate $e$, one end of which shaft projects through a slot $h^2$ in the case $a$. The disk $h$ is caused to bear against and hold the plate $b$ in position in the ring $c$ by a pin $h^3$, which passes longitudinally through the shaft $h'$ to the outside of the apparatus, it being kept in position by a spring-fork $h^4$ engaging a groove $h^5$ in it, as shown in Fig. 7. The head of the pin $h^3$ is fixed to a spring-plate $h^6$, carried by the disk $h$, whereby the said disk bears against the plate $b$ with a spring-pressure. By disengaging the fork $h^4$ from the groove $h^5$ the pin $h^3$ and disk $h$ can be removed, so that the plate $b$ can be taken out of the ring $c$ and another plate inserted.

$i$ is the pinion connected with the plate $b$, the said pinion being formed in the outer end of the pin $h^3$, and $j$ is the rack engaging therewith, the said rack being formed on a bar pivoted to the case $a$ at $j'$ and held securely in gear with the pinion by a pivoted spring-catch $j^2$ engaging a tooth $j^3$ at the top of the rack. By this arrangement of rack and pinion the rotation of the plate $b$ will cause the pinion to travel along the rack, whereby the spiral series of pictures $k$ on the plate $b$ can be exhibited. By pressing toward each other handles $j^4$ on the rack and catch the catch and rack will respectively be disengaged from the rack $j$ and pinion $i$, thus enabling the pinion to be moved back to its initial position by a thumb-piece $k'$, connected to the slide $e$ and projecting through a slot in the case $a$.

$a^2$ $a^3$ are openings in the opposite ends of the case $a$.

$l$ is the objective lens, mounted in a bar $l'$, and $l^2$ is a condensing-lens arranged in the opening $a^3$, which lens serves for the passage of the light from a suitable lantern, through the image on the plate $b$, lens $l$, and opening $a^2$, onto a screen. The bar $l'$ is mounted on trunnions $n$ $n$ in opposite sides of the case $a$, so that it can be turned out of the way in the direction of the arrow, Fig. 2, when placing in or taking out of the apparatus a plate $b$. A catch $n'$, pivoted at $n^2$ to the case $a$, is provided to engage a pin $n^3$ on the bar $l'$ and hold it in position, as shown in Fig. 2. $n^4$ is an adjustable stop to determine this position.

$m$ is the rotary shutter, carried upon a shaft $o^2$ and operated from the gear-wheel $g^2$ through the medium of the gear-wheel $p$, shaft $p'$, and bevel-wheels $p^2$ $p^3$, the shutter being so geared that it rotates once for two rotations of the cam $f$, so that when the cam is holding the plate $b$ stationary an opening in the shutter allows one of the pictures on the said plate to be projected onto the screen. The shutter $m$ has diametrically-opposed portions cut away for the passage of the projected pictures.

The operation of the improved apparatus is as follows—that is to say, a plate $b$, having the required spiral series of pictures thereon, must first be placed in position in the ring $c$, as shown. By turning the handle $g'$ the plate $b$ will be intermittently rotated by the spiral cam $f$ and the shutter $m$ continuously rotated, the solid portions of the shutter obscuring the light when the plate $b$ is moving, while the cut-away portions allow the light to pass when the plate $b$ is stationary, one of the series of pictures being always in line with the lenses when the plate is stationary. The gradual downward movement of the plate $b$ due to the engagement of the pinion $i$ and rack $j$ enables the whole series of pictures to be brought in succession in line with the lenses, so that they can be projected.

Having now described my invention, what I claim as new, and desire to secure by Letters Patent, is—

1. In apparatus of the kind described, the combination with the lenses, the transparent picture-plate, the ring of teeth connected to the plate, the cam engaging the said teeth and the shutter, of a pinion connected to the plate and a toothed rack connected to the case of the apparatus and gearing with the pinion substantially as described.

2. In apparatus of the kind described, the combination with the lenses, the transparent picture-plate, the ring of teeth connected to the plate, the cam engaging the said teeth and the shutter, of a pinion connected to the plate, a toothed rack connected to the case of the apparatus and gearing with the pinion and means for disengaging the rack from the pinion substantially as described.

3. In apparatus of the kind described the combination with the lenses, the transparent picture-plate, the ring of teeth connected to the plate, the cam engaging the said teeth and the shutter, of a pinion connected to the plate, a pivoted toothed rack connected to the case of the apparatus and gearing with the pinion and a pivoted spring-catch for normally holding the rack in engagement with the pinion substantially as described.

4. In apparatus of the kind described the combination with the cam for intermittently rotating the picture-plate of a shaft $f$ carrying the cam, a universal joint $g^7$ connected to the said shaft, a shaft $g^6$ connected at one end to the said joint, a universal joint $g^5$ connected to the other end of the said shaft, a sliding shaft $g^4$ connected to the joint $g^5$, a pinion $g^3$ on the shaft $g^4$ a gear-wheel $g^2$ gearing with the pinion $g^3$ a shaft $g$ carrying the wheel $g^2$ and a crank-handle on the shaft $g$ substantially as described.

5. In apparatus of the kind described the combination with the case of an annular picture-plate, a toothed ring engaging the outer edge of the plate, rollers supporting and guiding the toothed ring a disk engaging the inner edge of the plate, a spring-plate connected to the disk, a pin fixed to the said spring-plate and a fork engaging the said pin and connected to the part carrying the pin substantially as described.

In witness whereof I have hereunto set my hand in presence of two witnesses.

LEONARD ULRICH KAMM.

Witnesses:
 OWEN CADLE,
 WILLIAM ENGELKE.